United States Patent
Greeb (10) Patent No.: US 9,656,306 B2
(45) Date of Patent: *May 23, 2017

(54) DIGITAL CLOSED LOOP PROPORTIONAL HYDRAULIC PRESSURE CONTROLLER

(75) Inventor: Kevin E. Greeb, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 772 days.

This patent is subject to a terminal disclaimer.

(21) Appl. No.: 13/489,832

(22) Filed: Jun. 6, 2012

(65) Prior Publication Data
US 2012/0241010 A1  Sep. 27, 2012

Related U.S. Application Data

(63) Continuation of application No. 12/024,148, filed on Feb. 1, 2008, now Pat. No. 8,215,329.

(51) Int. Cl.
*B08B 9/027* (2006.01)
*B08B 9/032* (2006.01)
*G05D 16/20* (2006.01)

(52) U.S. Cl.
CPC ......... *B08B 9/0326* (2013.01); *G05D 16/202* (2013.01); *Y10T 137/0318* (2015.04);
(Continued)

(58) Field of Classification Search
CPC ................ B08B 9/0326; G05D 16/202; Y10T 137/0318; Y10T 137/0402;
(Continued)

(56) References Cited

U.S. PATENT DOCUMENTS

| | | |
|---|---|---|
| 3,208,465 A | 9/1965 | Virbila |
| 4,391,430 A | 7/1983 | Miller |

(Continued)

FOREIGN PATENT DOCUMENTS

EP    0 646 853 A2    4/1995

OTHER PUBLICATIONS

Woodward, CPC Current to Pressure Converter, Product Specification 85202 (Rev. G); manual; 1996; 4 pages.
(Continued)

*Primary Examiner* — William McCalister
(74) *Attorney, Agent, or Firm* — Reinhart Boerner Van Deuren P.C.

(57) ABSTRACT

A digitally controlled current to pressure converter (CPC) is provided. A digital CPC utilizes a digital controller and an onboard pressure transducer to accurately control the output pressure based upon an input analog control signal. The digital controller includes an anti-silting algorithm that provides an impulse movement of the three-way rotary valve of the CPC to loosen and flush away silt contamination from the valve. A redundant seal stack including an intermediate passage to the hydraulic drain ensures a low pressure drop across the outboard seal minimizing the potential for leakage and improving reliability of the CPC. The digital controller also includes redundancy and fault management algorithms that enable the use of multiple inputs and feedback signals for control of the CPC. Master/slave operation and transitioning is also provided by the digital controller.

12 Claims, 9 Drawing Sheets

(52) U.S. Cl.
CPC .... *Y10T 137/0402* (2015.04); *Y10T 137/2409* (2015.04); *Y10T 137/5762* (2015.04); *Y10T 137/7761* (2015.04)

(58) Field of Classification Search
CPC ......... Y10T 137/2409; Y10T 137/5762; Y10T 137/7761
USPC ................................ 137/85, 487.5; 700/282
See application file for complete search history.

(56) References Cited

U.S. PATENT DOCUMENTS

| | | | |
|---|---|---|---|
| 4,430,846 A | 2/1984 | Presley et al. | |
| 4,510,963 A | 4/1985 | Presley et al. | |
| 4,858,637 A | 8/1989 | Rempel et al. | |
| 4,864,210 A | 9/1989 | Dantlgraber | |
| 4,866,940 A | 9/1989 | Hwang et al. | |
| 5,158,108 A * | 10/1992 | Semaan et al. | 137/487.5 |
| 5,567,123 A | 10/1996 | Childress et al. | |
| 5,720,313 A * | 2/1998 | Grobbel | 137/10 |
| 6,827,050 B2 | 12/2004 | Cotton, III et al. | |
| 6,889,705 B2 * | 5/2005 | Newman et al. | 137/487.5 |
| 2007/0289638 A1 | 12/2007 | Ishitoya et al. | |

OTHER PUBLICATIONS

Woodward, CPC Current to Pressure Converter, Product Specification 85202D; manual; 1996; 4 pages.

Woodward, Industrial Controls Non-restricted Publications Index, Manual 26300; Oct. 25, 2005; 68 pages.

Woodward, CPC Current to Pressure Converter, Product Specification 85202C; manual; 1996; 4 pages; http://www.woodward.co.kr/PRODUCT%20SPECIFICATIONS/CPC-Current%20to20%pressure%20converter.pdf.

* cited by examiner

DIGITAL CLOSED LOOP PROPORTIONAL HYDRAULIC PRESSURE CONTROLLER

CROSS-REFERENCE TO RELATED PATENT APPLICATION

This patent application is a Continuation of co-pending U.S. patent application Ser. No. 12/024,148, filed Feb. 1, 2008, the entire teachings and disclosure of which are incorporated herein by reference thereto.

FIELD OF THE INVENTION

The present invention relates generally to positioning control systems for steam and fuel valves and their associated servo mechanisms, and more particularly to current to pressure converters (CPC) that convert an analog current control signal to hydraulic pressure for use therewith.

BACKGROUND OF THE INVENTION

Many control components in plants, buildings, and other manufacturing facilities utilize hydraulic pressure to position the actuators, control valves, or operating surfaces of these components. Such components include steam control valves, fuel valves, dampers, vanes, etc. One common means of positioning the actuators is to provide a linearly increasing variable hydraulic pressure that acts upon the piston of a linear hydraulic actuator or vane of a rotary cylinder. The opposing force required to counterbalance this variable pressure and thus create proportionality can be in the form of an opposing spring, or hydraulic pressure.

While purely hydraulic valving and control systems have been utilized to effectuate the positioning of these control components, modern electronic controls have increased the functionality and flexibility of the system control. Such component, system, and plant controllers typically utilize PLC- or DCS based computing systems to monitor and control the various components within the system. The use of such controllers, therefore, necessitates the use of an interface component that is capable of taking the control signal outputs from such controllers and converting those electronic control signals into hydraulic control signals that can effectuate the positioning and control of the hydraulic actuated components. One such interface control device is known as a current to pressure converter (CPC).

A typical CPC is configured to receive an analog 4-20 mA control signal from a system or plant controller. This 4-20 mA control signal is then proportionally converted into a hydraulic output pressure by the CPC. As such, the CPC may be thought of as a electrohydraulic, pressure regulating valve. Such CPCs typically include an internal 3-way valve, actuator, pressure sensor or pressure feedback mechanism, and on-board analog electronics. A cascade control loop is typically employed to achieve closed loop control of pressure. The first control loop compares the input control signal or pressure setpoint to the measured feedback. The difference is then modified by a circuit or algorithm to generate a position demand signal which is the input of the second control loop. The position demand signal is then compared to the measured position and the difference modified by a circuit or control algorithm to produce a drive signal which will open or close the actuator to match the position demand over time. The combined operation of the dual control loops in conjunction with the actuator and valve ensures that the measured feedback matches the setpoint over time.

The valve internal to the CPC is a three way control valve. At the center position, the control port is isolated from both the supply and drain. By moving the valve slightly above the center position, the control port is connected to the supply port resulting in an increase in pressure. By moving the valve below the center position, the control port is connected to the drain, resulting in a decrease in pressure. A return spring is provided in the assembly such that in the event of loss of power or an electric fault, the valve will move to the "minimum pressure" position which in most applications is the direction to shut down the turbine.

While current CPC's perform adequately in many applications, the accuracy of such control in some installations may be adversely effected by the thermal drift associated with the analog control circuits within the CPC itself. Further, CPC malfunction has been noted in some systems that do not typically change the positioning of the control component for long periods of time, or in backup CPC's in systems that utilize a primary and backup regulator to ensure system operation in case of malfunction of the primary CPC. Such malfunctions have been determined to be caused by the build-up of silt and other contaminates that have accumulated on the valve element during a long period of stagnant control.

In view of the above, the inventor has recognized a need for a new and improved CPC that overcomes the inaccuracies resulting from thermal drift of the analog control circuits and that ensures continued operation even after extended periods of inactivity that would otherwise result in silt build-up on the valving element leading to malfunction. Embodiments of the present invention provides such a new and improved CPC.

BRIEF SUMMARY OF THE INVENTION

In view of the above, embodiments of the present invention provide a new and improved current to pressure converter (CPC) that overcomes one or more of the problems existing in the art. More particularly, embodiments of the present invention provide a new and improved CPC that does not suffer from inaccuracies resulting from thermal drift of the analog control components used in some CPC's. Still further, embodiments of the present invention may also eliminate or greatly reduce the likelihood of CPC malfunction in installations experiencing long periods of inactivity between repositioning of the control valve therein.

An embodiment to the present invention includes fully digital processing of the control loop and diagnostic signals, which beneficially reduces the thermal drift associated with the prior analog control systems used to control the CPC. An onboard pressure sensor is also incorporated in one embodiment to provide closed loop control of the output pressure. Such onboard pressure sensor offers improved linearity and accuracy over previous CPC's that utilized force feedback devices.

Improved reliability is provided in one embodiment by including a redundant, dynamic sealing system with an intermediate passage to the hydraulic drain circuit to ensure that the pressure drop across the outboard seal is very low, thereby minimizing the potential for leakage and improving the reliability of the CPC. One embodiment of the present invention also includes provisions for improved redundancy and fault management to ensure failsafe operation in the event of internal component failure.

Reliable operation is also provided in embodiments of the present invention through the inclusion of an anti-silting algorithm that will deter the accumulation of fine silting particles. Such accumulation has been problematic and a chronic problem on steam turbines which use the turbine's lube/oil for the hydraulic supply. Embodiments of this algorithm will introduce a small amplitude, symmetrically opposed, impulse on the position of the rotating valve. This impulse will rotate the valve element very slightly to loosen and flush away any silt that has accumulated on the valve element. In one embodiment, the impulse is of a very short duration, and includes opposed negative then positive components. In such an embodiment the result is a near net zero displacement of fluid in the output circuit controlled by the CPC. As such, there is no or only minimal detectable behavior of the output servo during the anti-silting impulse. Such small amplitude, symmetrically opposed impulse may be applied periodically, at fixed time intervals, and can be easily adjusted by the user based on the oil quality of the application.

In other embodiments of the present invention, the digital controller may monitor driver current levels, and may increase or decrease the interval between impulses automatically upon the detection of a variance in driver current levels that may indicate the buildup of contamination, or lack thereof, to effectuate a self tuning of the interval based upon actual need.

Reliable operation is also provided in embodiments of the present invention through the inclusion of redundant control inputs for either the main control setpoint or the pressure transducer used for closed loop control. Historically operation of the turbine is often adversely impacted by failure of the main controller, wiring between the controller and CPC, or the transducer used for pressure feedback. In the preferred embodiment a second input is provided which can be configured to monitor a $2^{nd}$ controller, or receive a $2^{nd}$ command signal via an independent wiring path from the turbine controller, or a $2^{nd}$ pressure feedback transducer. As such, the user can configure the installation of the CPC for additional robustness to these failure modes, and the logic executed within the CPC will utilize the $2^{nd}$ input signal to maintain operation in the event of failure.

In applications requiring the highest level of reliability, two CPC's are sometimes applied in a tandem arrangement. In this configuration, failure modes of the turbine control system, the control wiring between the control and the CPC, or failure of the CPC itself can largely be mitigated. In the preferred embodiment the two CPC's have a status link wired directly from one unit to the other. As such, each CPC knows the operational status of the other and should a fault occur within the CPC in control of the system, the back-up unit can resume control in an extremely short time interval without intervention from the main turbine or plant controller. This minimizes the potential for dynamic transitions which could adversely effect the speed or load of the turbine.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
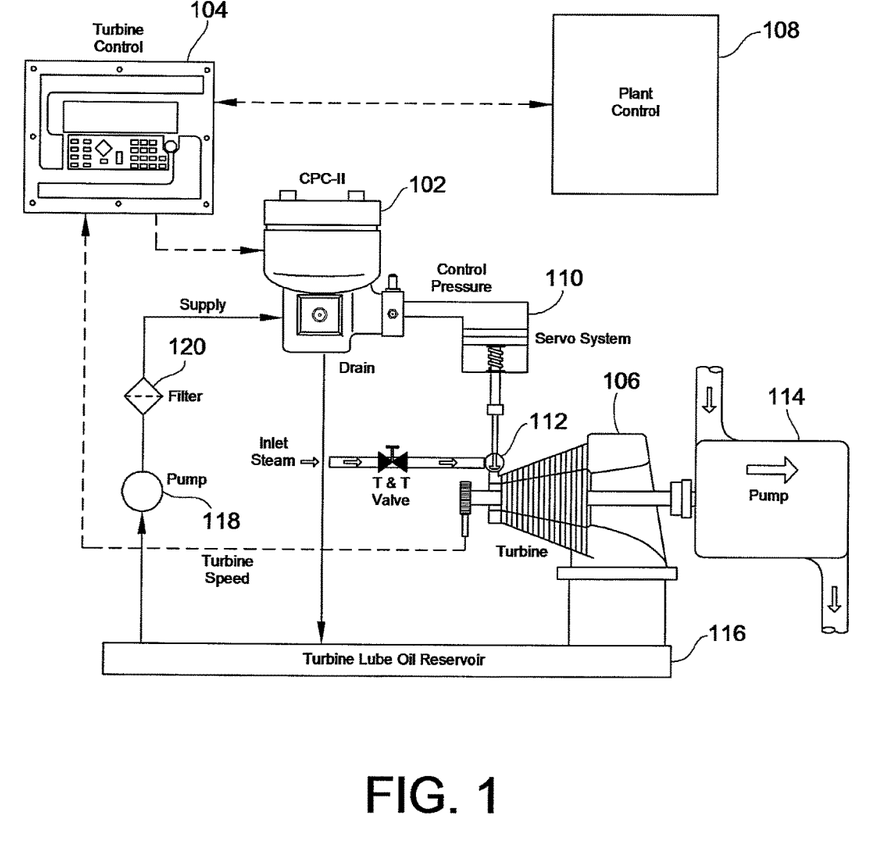
FIG. 1 is a simplified system level diagram of a typical installation of an embodiment of a CPC constructed in accordance with the teachings of the present invention.

Turning now to the drawings, and specifically to FIG. 1, there is illustrated a typical turbine control system 100 to which embodiments of the present invention are particularly well suited. However, while the following description will utilize this exemplarity installation of an embodiment of a CPC 102 constructed in accordance with the teachings of the present invention, this installation is not meant to be limiting, but will aid in the understanding of the functionality and advantages provided by such a CPC 102. Other installations and operations of embodiments of the present invention will be recognized by those skilled in the art from the following description, and application thereof are specifically reserved.

In such an installation as illustrated in FIG. 1, the CPC 102 may interface with a turbine controller 104, such as a Model 505/505E Steam Turbine Digital Controller available from the assignee of the instant invention. Such a turbine controller 104 is typically microprocessor-based and is designed to operate steam turbines 106, such as, e.g. single extraction and/or admission steam turbines. Embodiments of the CPC 102 may also interface with a system plant controller 108 to provide, for example, feedback information from the CPC 102 as well as fault information.

In operation, the CPC 102 receives command signals from the turbine controller 104 in the form of an analog control signal varying between 4 and 20 mA. The control logic within the CPC 102 processes this control command signal and either increases or decreases the hydraulic pressure to the turbine's servo system 110. The servo system 110 is operable to vary a steam control valve 112 to vary the operating speed of the steam turbine 106. In the system illustrated in FIG. 1, the steam turbine 106 is used to drive a load, such as a pump 114, a generator (not shown), etc. As will be discussed more fully below, when the CPC 102 determines that additional hydraulic pressure is needed, it sources hydraulic fluid from tank 116 via pump 118 and filter 120 to the servo system 110. When the CPC 102 determines that less hydraulic pressure is needed, the CPC operates to drain hydraulic fluid back to tank 116.

Figure 2:
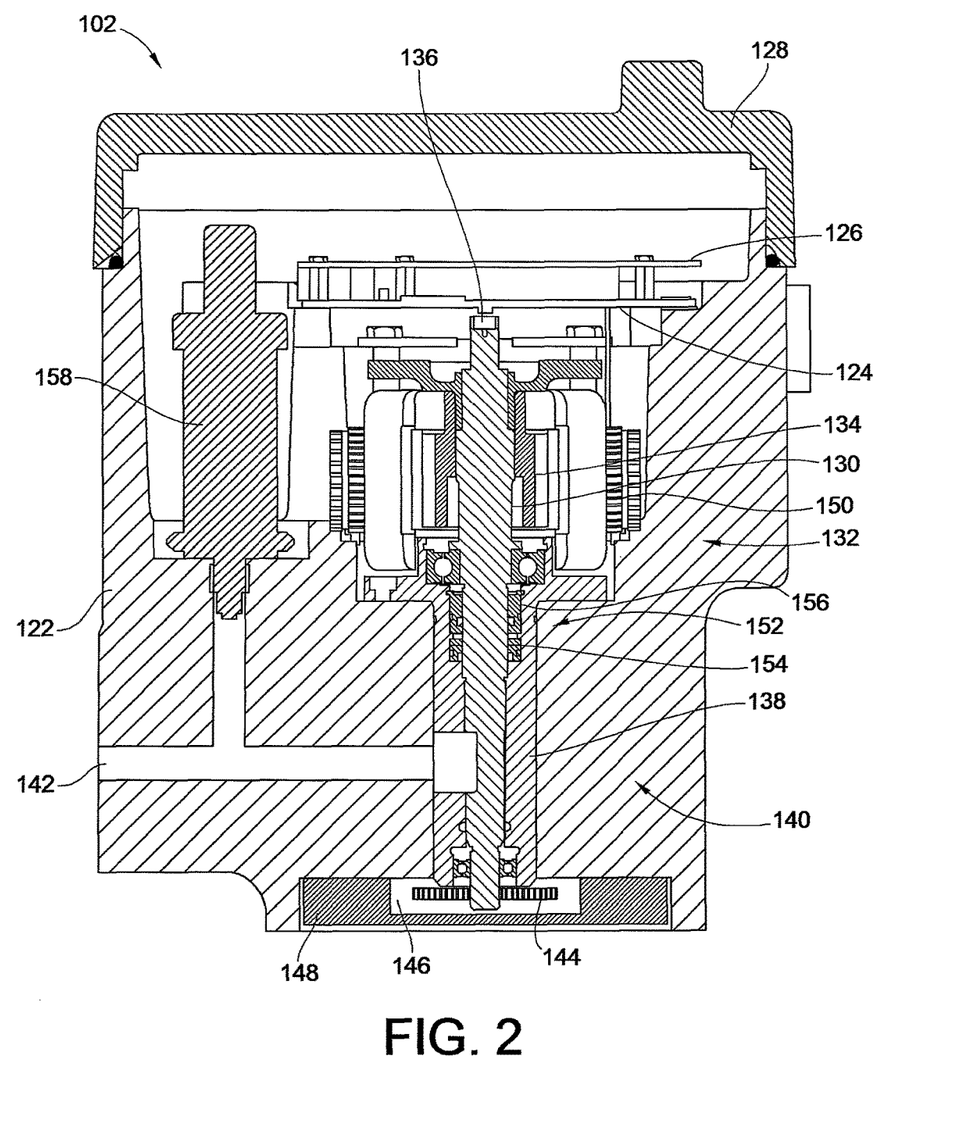
FIG. 2 is a cross-sectional illustration of an embodiment of a CPC constructed in accordance with the present invention.

To effectuate such operational control, the CPC 102 includes digital control mounted internal to the housing 122 on a digital electronic assembly (referred to hereinafter as a digital printed circuit board (PCB) 124) as may be seen in FIG. 2. This digital PCB 124 is protected by a PCB cover 126 and may be accessed by removing the access cover 128 which meets with the housing 122 to form a sealed enclosure.

The controller mounted on this digital PCB 124 controls the position of the hydraulic control shaft 130 via a rotary limited angle torque (LAT) actuator 132. Specifically, the LAT 132 includes a permanent magnet rotor 134 that is directly coupled to the hydraulic control shaft 130. The position of the rotor 134 is measured by a solid state integrated circuit on the digital PCB 124 which detects the direction of the sensing magnet 136 on the hydraulic control shaft 130. The H-bridge drive of the LAT 132 is regulated by the microprocessor on the digital PCB 124 to control the position of the hydraulic control shaft precisely to maintain the pressure set point received from the turbine controller 104.

The hydraulic control shaft 130 rotates within a hydraulic control bushing 138 that is ported to form a three-way rotary valve 140. This three-way rotary valve 140 controls the hydraulic fluid flow from the supply (not shown) to the control port 142 and from the control port 142 to the drain (not shown). In a preferred embodiment, both the hydraulic control shaft 130 and the hydraulic control bushing 138 are made of stainless steel. This offers precise, reliable, and contamination-tolerant operation on typical oils used for steam turbine lubrication.

To provide failsafe operation in the event of component or power failure, a spiral power spring 144 operates the bottom portion of the hydraulic control shaft 130 in the lower cavity 146 of the housing 122. Access to the spiral power spring 144 is via lower cover 148. In the event of power failure, the spiral power spring 144 will provide sufficient rotary power to rotate the hydraulic control shaft 130 into a failsafe condition. One embodiment of this failsafe condition couples the control port 142 with the drain.

To protect the dry stator 150 a redundant dynamic sealing system 152 is utilized. This redundant dynamic sealing system 152 includes an intermediate passage 154 to the hydraulic drain circuit. This ensures that the pressure drop across the outboard seal 156 is very low, minimizing the potential for leakage and improving the reliability of the CPC 102.

Precise hydraulic pressure control is aided by the inclusion of a pressure transducer 158 that provides the microprocessor with a precise indication of the current hydraulic pressure supplied via control port 142. This on-board pressure transducer 148 improves the linearity and accuracy of the closed loop control of the output pressure over prior CPC's that utilized a force feedback device.

Figure 3:
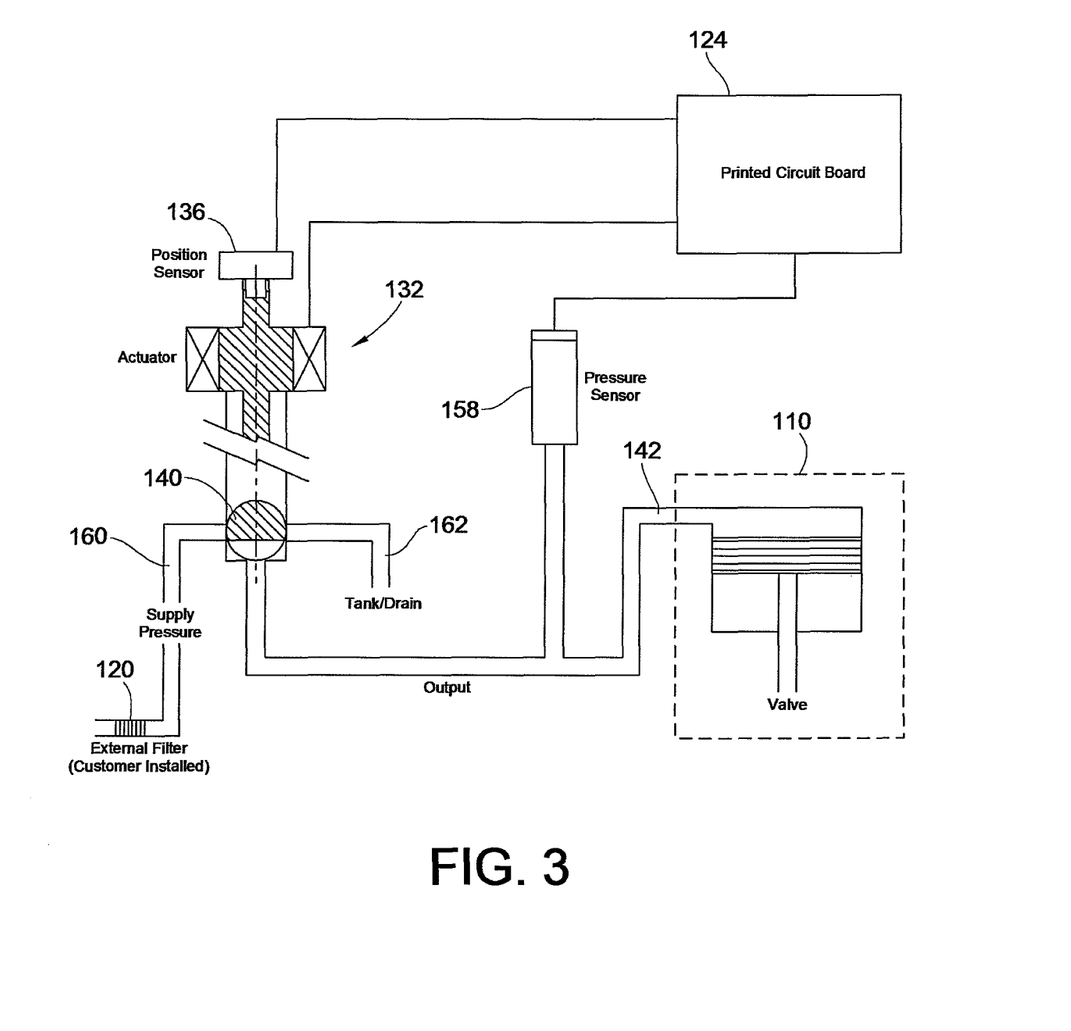
FIG. 3 is a hydraulic schematic of the CPC of FIG. 2.

The simplified hydraulic schematic of FIG. 3 provides an illustration of the operational connection of the hydraulic control circuit within the CPC 102. As may be seen, the digital PCB 124 provides a position control signal to the LAT 132 to position the three-way rotary valve 140. Position feedback for the closed loop control is provided by the sensing magnet 136. As discussed briefly above, the 3-way rotary valve 140 is designed to couple the control port 142 with either the supply port 160 or the drain port 162 to control the pressure, sensed by pressure transducer 158, to the servo system 110 in accordance with the control signal received from the turbine controller 104 (see FIG. 1).

As may be seen from this hydraulic schematic of FIG. 3, when the 3-way rotary valve 140 is in the mid position, the control port 142 is coupled to neither the supply port 160 nor the drain port 162. In this configuration, the output hydraulic pressure is held constant at control port 142. If the pressure drops below the set point pressure, the PCB 124 will command the LAT 132 to rotate the valve such that control port 142 is connected to the supply port 160 to increase the pressure in the control port 142 (as sensed by pressure transducer 158). If, however the hydraulic pressure at the control port 142 is higher than desired, the control circuitry on the PCB 124 will command the LAT 132 to position the 3-way rotary valve 140 so as to couple the control port 142 to the drain port 162 to lower the pressure at the control port 142.

Figure 4:
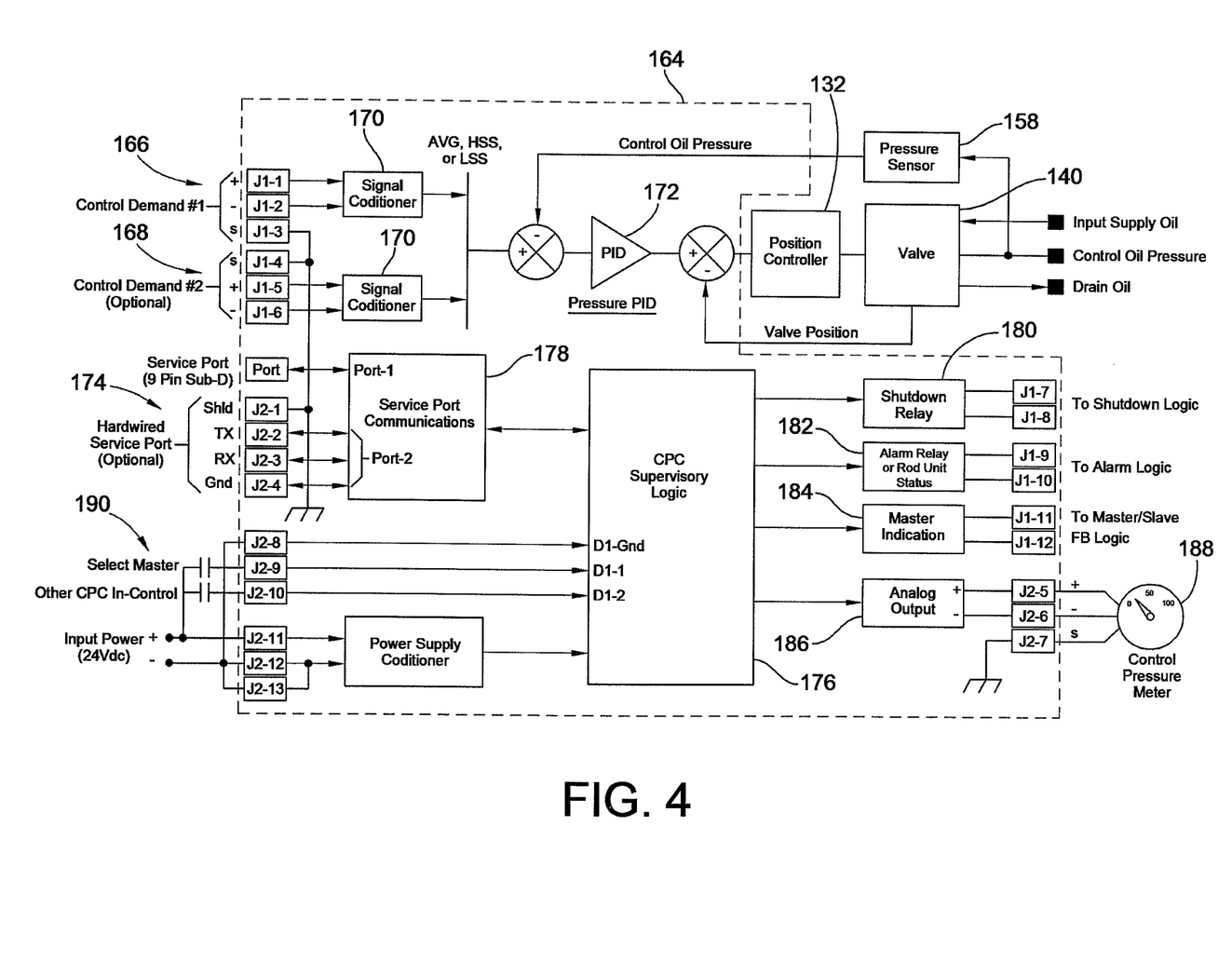
FIG. 4 is a simplified CPC controller block diagram illustrating one embodiment of a controlled constructed in accordance with the teachings of the present invention.

This dynamic pressure control is controlled by a digital control algorithm 164 executed within the digital PCB 124, such as that illustrated in simplified block diagram form in FIG. 4, to which reference is now made. As may be seen from the simplified block diagram, the digital controller 164 may include a control demand input 166 and, in one embodiment, a redundant control demand input 168. This or each of these inputs are passed through signal conditioners 170. The control logic for dealing with two controlled demand inputs will be discussed more fully below. Once this control demand input is determined, it is used in a pressure proportional integral derivative (PID) control loop 172. As illustrated, this PID control loop 172 receives a control oil pressure feedback from pressure transducer 158 and a feedback position signal from the sensing magnet 136 (not shown). Based on this information, the digital controller 164 controls the position of the valve 140 via the LAT 132.

The digital controller 164 also includes in an embodiment a service port 174 that interfaces with the CPC supervisory logic 176 via a service port communications module 178. This service port allows, for example, field programming and diagnostics via a PC or microprocessor-based service tool. The CPC supervisory logic 176 monitors the operation of the CPC and includes outputs for a shutdown relay 180, an alarm relay or red unit status 182, a master slave indication 184 where such functionality is provided (see description below regarding FIG. 5), and/or analog output 186 that is capable of driving, for example, a control pressure meter 188.

Figure 5:
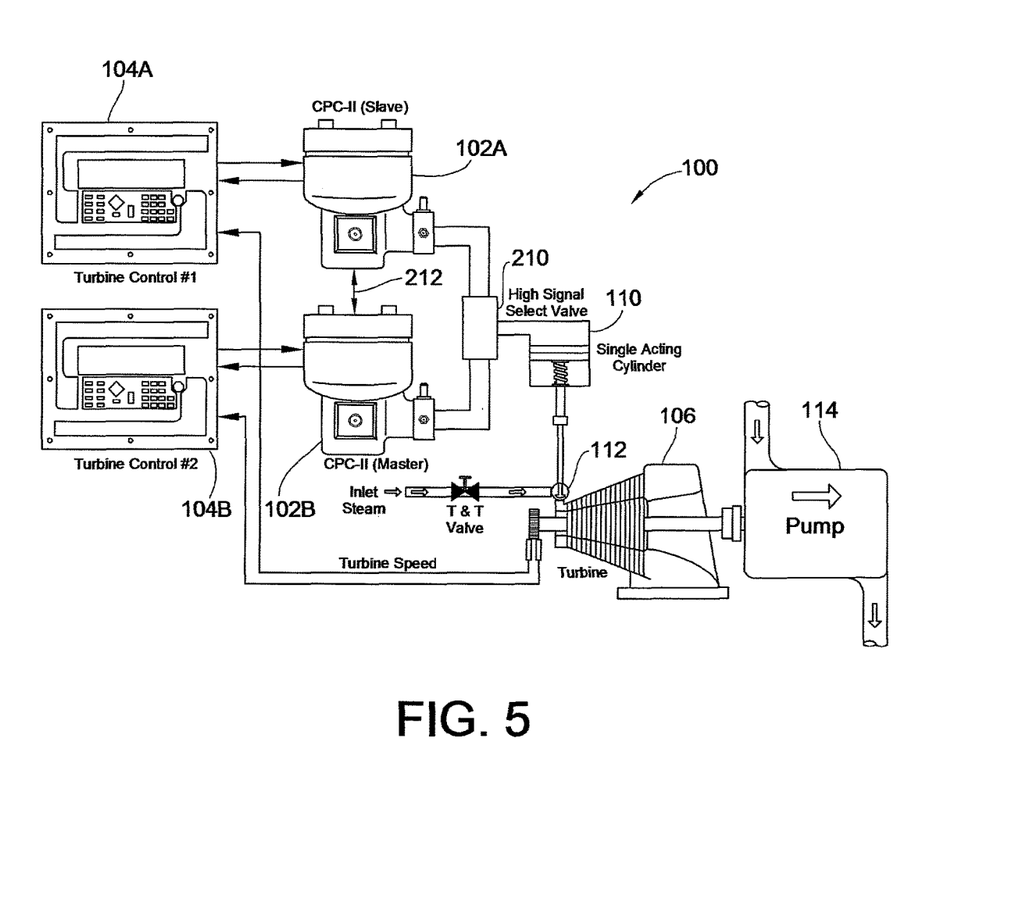
FIG. 5 is simplified system level diagram of a master/slave CPC installation constructed in accordance with the teachings of the present invention.

In the embodiments of the CPC 102 of the present invention that are utilized in a master/slave environment such as that shown in FIG. 5, the CPC supervisory logic 176 also includes master/slave inputs 190. These master/slave inputs 190 may be utilized with external jumpers or relays to establish an initial role for the particular CPC based on installation location. However, even in systems that utilize initial role designations, the CPC supervisory logic 176 includes logic to facilitate control transfer between CPCs upon the detection of a fault of a master or other conditions that may necessitate or make desirable such control transfer.

As illustrated in FIG. 4, the master indication output 184 includes two status lines that connect to the other CPC(s). The CPC supervisory logic 176 in each CPC 102 monitors these lines. If either CPC 102 fails, or if the signal line fails, the other CPC will take control within a prescribed period of time, i.e. 10 milliseconds. This minimizes any transition bump to the servo system 110 which can occur with prior CPC's wherein such delay between switching to a new CPC control upon the failure of the master may be 100 milliseconds or more depending upon the computing rate of the main controller. As will be recognized by those skilled in the art, such a long transition time may result in a very large control pressure transient and corresponding changes in speed or load of the controlled plant.

A simplified single line illustration of a system 100' utilizing a slave CPC 102A and associated slave turbine controller 104A in addition to the master CPC 102B and associated master turbine controller 104B is shown in FIG. 5. As discussed above, control of the hydraulic pressure to the servo system 110 is provided by the master CPC 102B until a fault is detected therewith. Upon determination that the master CPC 102B has failed, the select valve 210 switches hydraulic pressure control to the slave CPC 102A. In an embodiment of the present invention, the two CPCs 102A/102B have a status link 212 wired directly from the master indication circuit 184 (see FIG. 4) of one CPC 102A to the other CPC 102B. As such, each CPC 102A/102B knows the operational status of the other CPC 102B/102A. Should a fault occur within the master CPC 102B in control of the system 100', the back-up unit or slave CPC 102A can assume control in an extremely short time interval without intervention from the main turbine or plant controller. This minimizes the potential for dynamic transitions which could adversely effect the speed or load of the turbine 106.

Figure 6:
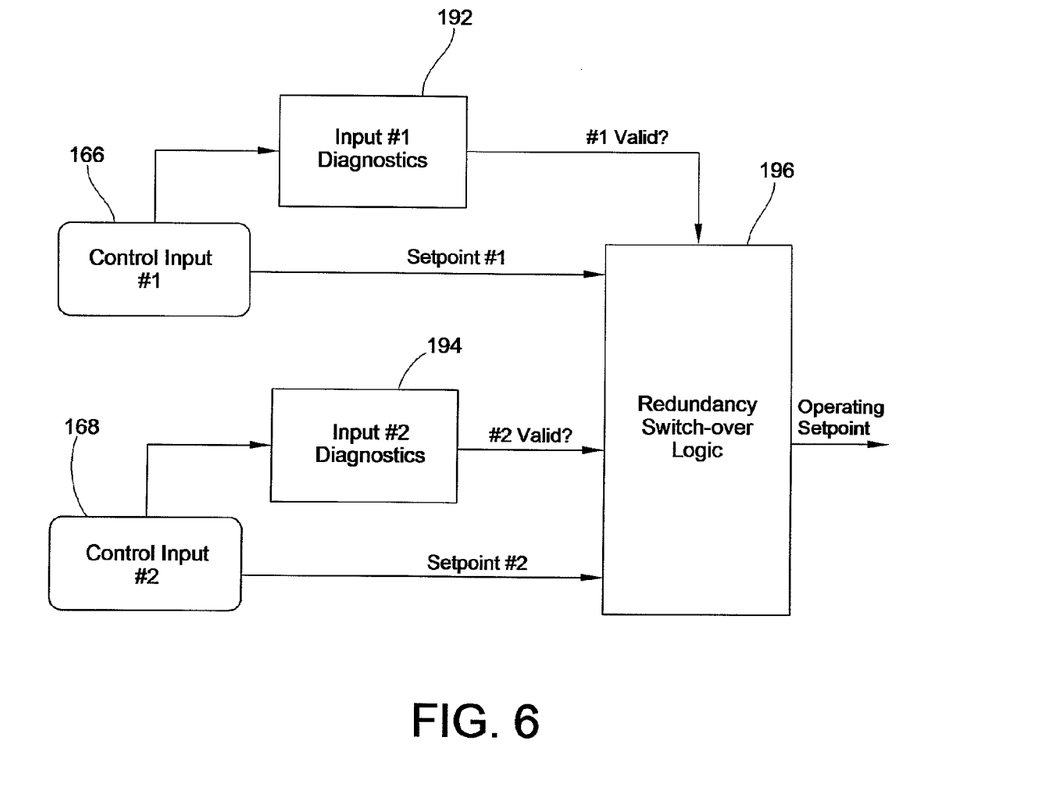
FIG. 6 is a simplified block diagram illustrating the redundancy switch over logic utilized in an embodiment to the present invention for redundant control inputs.

FIG. 6 illustrates a functional block diagram of the redundancy switch over logic 196 utilized in embodiments of the present invention that include multiple control inputs 166, 168. Specifically, each control input 166, 168 is monitored by input diagnostics 192, 194 to evaluation the reasonableness of the values on each of the two control inputs 166, 168. If the input diagnostics 192, 194 determines that one of the input signals 166, 168 is considered faulty, e.g., out of range, unstable, etc., it will be voted out of the chain by the redundancy switch over logic 196 and the CPC 102 will continue to operate only based on the non-faulty input. If the redundancy switch over logic 196 determines that both signals are faulty, then the CPC is commanded to a failsafe position and an appropriate alarm or other indication is provided. If both input signals are considered valid, although different, the redundancy switch over logic 196 may simply select one of the two inputs for control, may average the two inputs, take the higher, the lower, or other input logic processing to provide the operating setpoint signal for the CPC 102.

Figure 7:
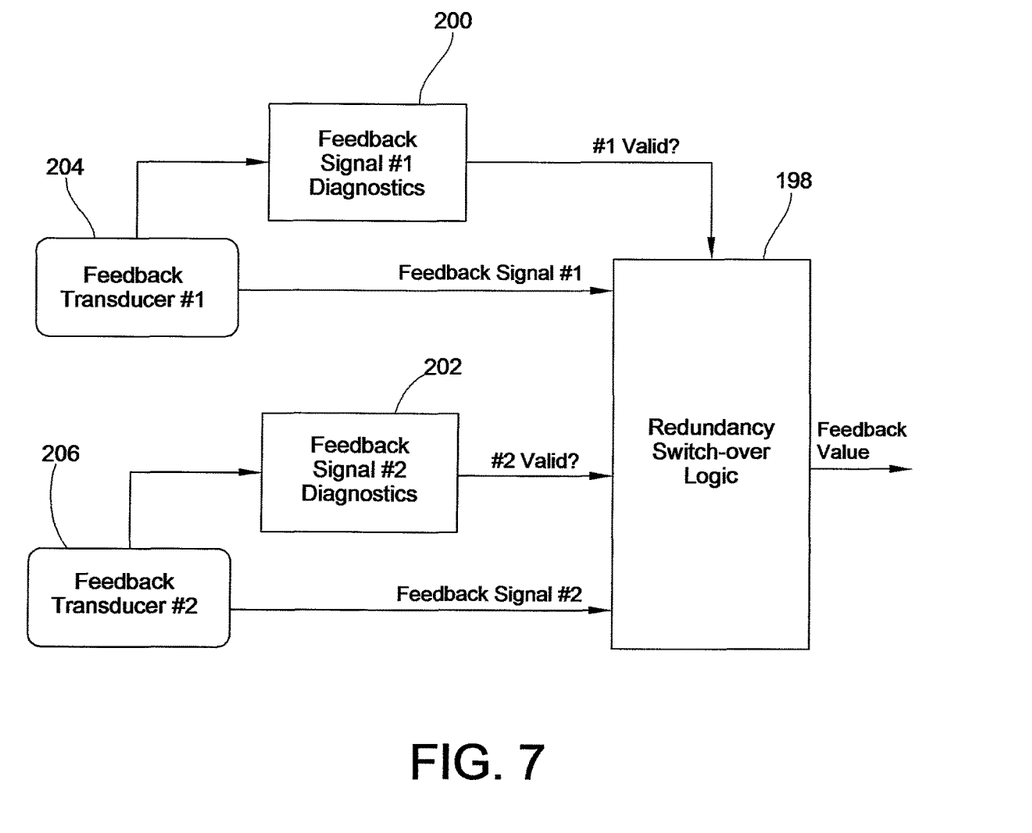
FIG. 7 is a simplified block diagram illustrating the redundancy switch over logic utilized in an embodiment to the present invention for redundant transducer feedback.

Similar redundancy switch over logic 198 may be utilized along with feedback signal diagnostics 200, 202 to evaluate the reasonableness of multiple feedback signals 204, 206 in embodiments that utilize multiple feedbacks, e.g., multiple feedback transducers, position sensors, etc. This feedback redundancy switch over logic 198 is illustrated in FIG. 7.

Figure 8:
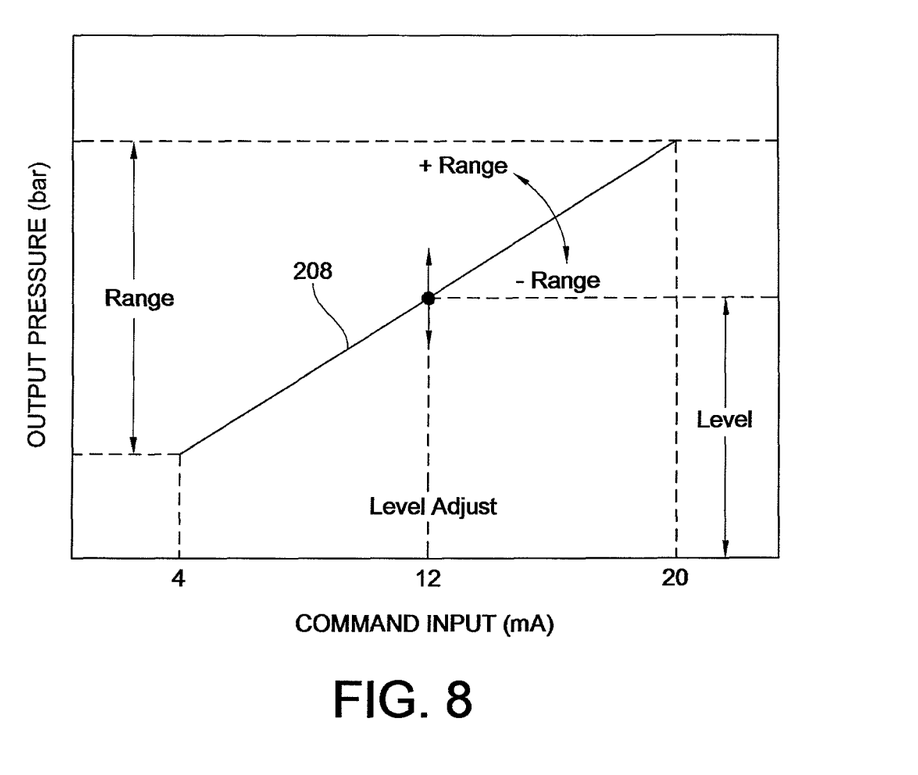
FIG. 8 is a graphical illustration of the output pressure verses command input available from one embodiment of the present invention.

As illustrated in FIG. 8, the digital controller 164 provides multiple adjustments that greatly increase the type of installations and functionality within each installation of the CPC 102 of the present invention. As shown in the output pressure versus command input scaling graphical illustration of FIG. 8, an adjustment can be made of the minimum pressure level and the maximum pressure level. The minimum pressure level adjustment sets the level of output pressure. Adjusting the minimum pressure level changes all points of the output pressure uniformly. That is, adjusting the minimum level sets the minimum travel of the servo system 110 (see FIG. 1). The maximum pressure level adjustment sets the maximum output pressure when the output command control signal is at 20 milliamps. Increasing this level increases the slope of the line 208 and the position of the output servo system for each value of the input signal.

The PID control loop 172 settings may also be adjusted to tune the dynamic performance of the CPC 102. The proportional gain may be adjusted to set the amount of gain (proportional action). In one embodiment fifty percent gain is used. As will be recognized by those skilled in the art, a high gain provides a fast response time, but can cause instability. The integral gain may also be adjusted to set the stability (integration action) of the PID control loop 172. This stability cooperates with the proportional gain setting to provide stable operation. Finally, a derivative component of the PID control loop 172 may also be adjusted to set the amplitude of the output dither.

As discussed above, failures of CPC's in installations that utilize redundant or backup CPC's or in systems that do not vary the hydraulic output for extended periods of time have been determined to be a result of the accumulation of fine silting particles. These failures are particularly acute in steam turbine applications such as that shown in FIG. 1 wherein the turbine's lubricating oil is used as the hydraulic control fluid. To overcome this problem, an embodiment of the CPC 102 of the present invention include a symmetrical anti-silting impulse function as part of its control logic. Specifically, the digital controller 164 includes an algorithm which introduces a small amplitude, symmetrically opposed, impulse on the position of the three-way rotary valve 140. This small impulse will cause a rotation of the three-way rotary valve 140 very slightly in both directions.

Figure 9:
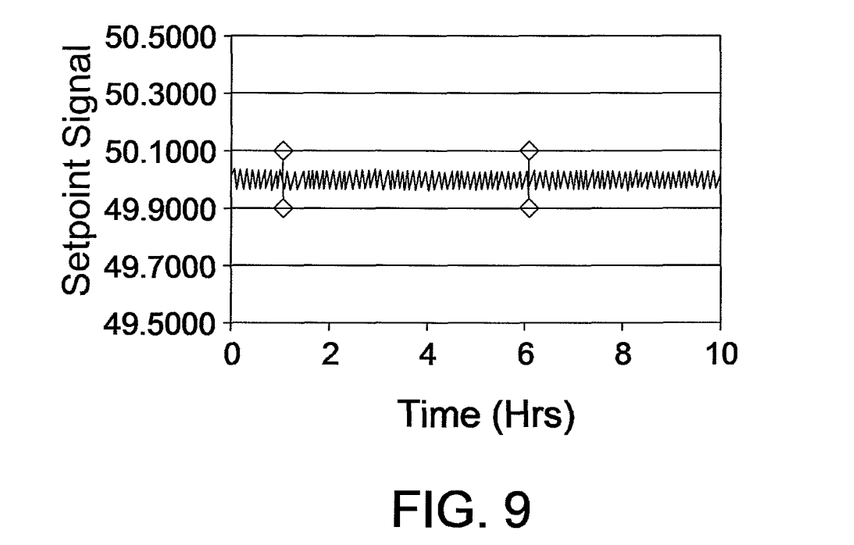
FIG. 9 is a graphical illustration of the symmetrical anti-silting impulse function effectuated by one embodiment to the present invention.

As illustrated in FIG. 9, these impulses may occur at fixed or periodic times. The selection of the interval may be set or varied based upon the particular installation and the amount of silt and contamination typically associated therein. These small impulses are effective in loosening and flushing away any silt that has accumulated on the valve element during the period of inactivity. The plot of FIG. 9 shows an impulse interval set at five hours. However, this interval may be manually or automatically varied within the CPC 102.

In one embodiment the automatic variation of the anti-silting impulse is based upon a detection of a deviation in the driver current levels needed to effectuate movement of the three-way rotary valve 140. Increased driver current requirements are an indication of the build-up of contamination on the valve. When such a condition is detected, the frequency of anti-silting impulses may be increased. Similarly, if the driver current is not sensed as being at a level that might indicate contamination build-up on the valving element, the anti-silting interval may be extended so as to prolong the life of the internal bearings and seals.

Figure 10:
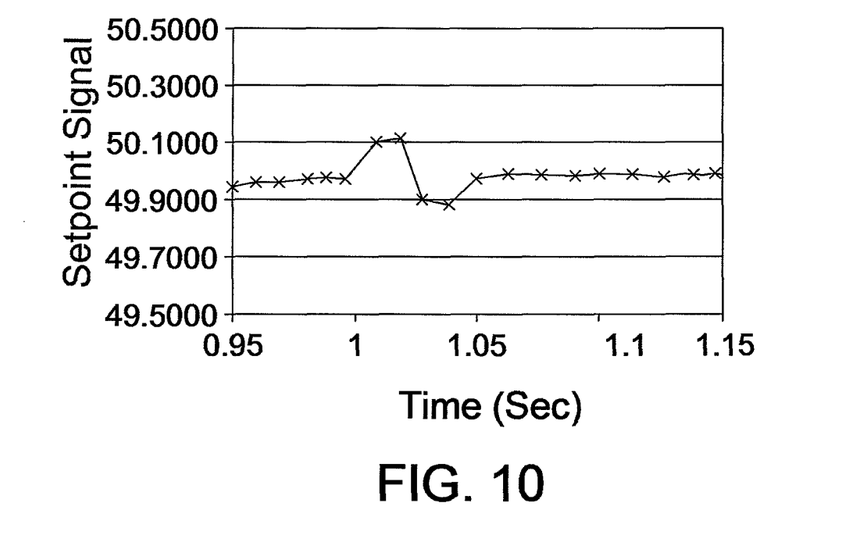
FIG. 10 is a graphical illustration of a single symmetrical anti-silting impulse event utilized in one embodiment of the present invention.

As illustrated in FIG. 10, each anti-silting impulse event is of very short duration and very low amplitude. Indeed, the use of the digital controller 164 allows adjustment of various parameters controlling the anti-silting impulse, such as the amplitude, frequency, and duration thereof. With regard to the amplitude of the anti-silting impulse, typically a one percent impulse is sufficient to flush contaminants from the CPC 102. However, this may be adjusted as required to achieve the anti-silting benefit within the parameters of the system performance. In one embodiment amplitudes up to five percent can be set either at the factory or in the field via the service tool interface discussed above. The frequency of the anti-silting impulse may also be adjusted as discussed above. While FIG. 9 illustrated an interval of five hours, other embodiments may utilize the impulse only once per day, although other installations may require impulses generated at a frequency from, for example, one minute to three months. This interval may also be set at the factory or in the field. Finally, the duration of each anti-silting impulse may also be varied. Depending on overall system performance issues, durations from four milliseconds to one hundred milliseconds may be utilized, with a typical duration of forty milliseconds being sufficient to loosen the silt without causing undue motion of the servo mechanism 110. However, longer or shorter durations may be set as required or desired.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A current to pressure converter (CPC), comprising:
   a housing defining a control port, a supply port, and a drain port fluidly coupled therethrough;
   a digital controller, configured to reduce the effects of thermal drift, enclosed within said housing;
   a 3-way rotary valve configured to alternatively couple the control port with the drain port, the supply port, or neither the drain port or supply port;
   a limited angle torque rotary actuator operatively coupled to the digital controller and drivably coupled to the 3-way rotary valve; and
   a pressure transducer in fluid communication with the control port, the pressure transducer providing pressure feedback to the digital controller; and
   wherein the digital controller is configured to control the pressure supplied by the control port in proportion to an input analog control signal of 4-20 mA; and
   wherein the digital controller is configured to periodically impart an anti-silting impulse to the 3-way rotary valve.

2. The CPC of claim 1, wherein the period of the anti-silting impulse is user programmable.

3. The CPC of claim 2, wherein the period of the anti-silting impulse is automatically shortened based on a sensed increase in drive current needed to rotate the limited angle torque rotary actuator.

4. The CPC of claim 1, wherein the anti-silting impulse imparts symmetrically opposed movement of the 3-way rotary valve.

5. The CPC of claim 4, wherein the anti-silting impulse is symmetrically balances thus unlikely to perturb operation of an external component controlled by the CPC.

6. The CPC of claim 4, wherein the anti-silting impulse is of a magnitude insufficient to perturb operation of an external component controlled by the CPC.

7. The CPC of claim 4, wherein the anti-silting impulse is of a duration and a magnitude insufficient to perturb operation of an external component controlled by the CPC.

8. A current to pressure converter (CPC), comprising:
   a housing defining a control port, a supply port, and a drain port fluidly coupled therethrough;
   a digital controller, configured to reduce the effects of thermal drift, enclosed within said housing;
   a 3-way rotary valve configured to alternatively couple the control port with the drain port, the supply port, or neither the drain port or supply port;
   a limited angle torque rotary actuator operatively coupled to the digital controller and drivably coupled to the 3-way rotary valve; and
   a pressure transducer in fluid communication with the control port, the pressure transducer providing pressure feedback to the digital controller;
   wherein the digital controller is configured to control the pressure supplied by the control port in proportion to an input analog control signal of 4-20 mA; and
   wherein the digital controller is configured to diagnose input signals to determine reasonableness thereof for use in controlling a position of the 3-way rotary valve.

9. A current to pressure converter (CPC), comprising:
   a housing defining a control port, a supply port, and a drain port fluidly coupled therethrough;
   a digital controller;
   a 3-way rotary valve configured to alternatively couple the control port with the drain port, the supply port, or neither the drain port or supply port;
   a rotary actuator operatively coupled to the digital controller and drivably coupled to the 3-way rotary valve; and
   wherein the digital controller is configured to periodically impart an anti-silting impulse to the 3-way rotary valve.

10. The CPC of claim 9, wherein the period of the anti-silting impulse is user programmable.

11. The CPC of claim 10, wherein the period of the anti-silting impulse is automatically shortened based on a sensed increase in drive current needed to rotate the rotary actuator.

12. The CPC of claim 9, wherein the anti-silting impulse imparts symmetrically opposed movement of the 3-way rotary valve.

* * * * *